(12) United States Patent
Rothschuh (10) Patent No.: US 10,290,887 B2
(45) Date of Patent: May 14, 2019

(54) FUEL CELL SYSTEM AND METHOD FOR OPERATING SUCH A SYSTEM

(71) Applicant: Volkswagen AG, Wolfsburg (DE)

(72) Inventor: Matthias Rothschuh, Braunschweig (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 154 days.

(21) Appl. No.: 15/241,539

(22) Filed: Aug. 19, 2016

(65) Prior Publication Data

US 2017/0054166 A1    Feb. 23, 2017

(30) Foreign Application Priority Data

Aug. 20, 2015   (DE) .................. 10 2015 215 927

(51) Int. Cl.
| | |
|---|---|
| *H01M 8/04746* | (2016.01) |
| *H01M 8/04111* | (2016.01) |
| *H01M 8/04119* | (2016.01) |
| *H01M 8/1018* | (2016.01) |

(52) U.S. Cl.
CPC .... *H01M 8/04753* (2013.01); *H01M 8/04111* (2013.01); *H01M 8/04141* (2013.01); *H01M 2008/1095* (2013.01)

(58) Field of Classification Search
CPC ......... H01M 8/04753; H01M 8/04111; H01M 8/04141; H01M 2008/1095
See application file for complete search history.

(56) References Cited

U.S. PATENT DOCUMENTS

| | | | |
|---|---|---|---|
| 7,824,815 B2 | 11/2010 | Yamazaki et al. | |
| 8,877,402 B2 | 11/2014 | Becker | |
| 2003/0012993 A1* | 1/2003 | Katagiri | H01M 8/04119 |
| | | | 429/414 |
| 2005/0037243 A1* | 2/2005 | Dubel | H01M 8/04089 |
| | | | 429/413 |
| 2007/0269695 A1* | 11/2007 | Yamazaki | H01M 8/04097 |
| | | | 429/415 |
| 2012/0321978 A1* | 12/2012 | Steinhauser | H01M 8/04022 |
| | | | 429/439 |
| 2015/0086894 A1 | 3/2015 | Ueda et al. | |
| 2016/0204455 A1* | 7/2016 | Kemmer | H01M 8/0488 |
| | | | 429/429 |
| 2016/0218383 A1 | 7/2016 | Hanschke et al. | |

FOREIGN PATENT DOCUMENTS

| | | |
|---|---|---|
| DE | 112005000767 T5 | 3/2007 |
| DE | 102008039407 A1 | 2/2010 |
| DE | 102013211913 A1 | 1/2014 |
| DE | 102013108069 A1 | 3/2014 |
| DE | 102013214705 A1 | 1/2015 |
| DE | 112013002056 T5 | 1/2015 |
| DE | 102013014413 A1 | 3/2015 |

OTHER PUBLICATIONS

Arendt, M; *Regelungstechnische Optimierung der Steuerung eines Brennstoffzellensystems im dynamischen Betrieb* (Optimizing the Control of a Fuel Cell System During Dynamic Operation), Dissertation, Logos Verlag Berlin, 2012.

* cited by examiner

*Primary Examiner* — Muhammad S Siddiquee
(74) *Attorney, Agent, or Firm* — Davidson, Davidson & Kappel, LLC (57) ABSTRACT

A fuel cell system (100), including a fuel cell (10), which has a cathode input (25) and a cathode output (27); a cathode supply path (24) situated upstream from the cathode input (25) and connected thereto; a cathode exhaust gas path (26) situated downstream from the cathode output (27) and connected thereto; a conveying means (32) situated in the cathode supply path (24) for conveying a cathode gas flow (GS_K) into the cathode input (25) and/or an adjustable exhaust gas throttle means (36), situated in the cathode exhaust gas path (26), for influencing a flow resistance of the cathode exhaust gas path (26); and a regulating device (46), configured to regulate the cathode gas flow (GS_K) and/or a cathode pressure (p_K) is provided. Also, a method (999) for operating a fuel cell system (100) of this type is provided.

17 Claims, 6 Drawing Sheets

FUEL CELL SYSTEM AND METHOD FOR OPERATING SUCH A SYSTEM

This claims the benefit of German Patent Application DE 102015215927.2, filed on Aug. 20, 2015 and hereby incorporated by reference herein.

BACKGROUND

The present invention relates to a fuel cell system, which includes a fuel cell having a cathode input and a cathode output, a cathode supply path situated upstream from the cathode input and connected thereto, a cathode exhaust gas path situated downstream from the cathode output and connected thereto, a conveying means situated in the cathode supply path for conveying a cathode gas flow into the cathode input and/or an adjustable exhaust gas throttle means situated in the cathode exhaust gas path for influencing a flow resistance of the cathode exhaust gas path, and a regulating device, configured to regulate the cathode gas flow and/or a cathode pressure. The present invention furthermore relates to a method for operating a fuel cell system of this type.

Fuel cells use the chemical conversion of a fuel into water with the aid of oxygen to generate electrical energy. For this purpose, fuel cells include the so-called membrane electrode assembly (MEA) as a core component, which is a structure made up of an ion-conducting (usually proton-conducting) membrane and a catalytic electrode (anode and cathode) situated on both sides of the membrane. The latter includes usually supported noble metals, in particular platinum. In addition, gas diffusion layers (GDL) may be situated on both sides of the membrane electrode assembly, on the sides of the electrodes facing away from the membrane. The fuel cell is generally formed by a large number of MEAs situated in a stack, whose electrical powers add up. Bipolar plates (also referred to as flow field or separator plates) are situated between the individual membrane electrode assemblies and ensure a supply of operating agents, i.e., reactants, to the individual cells and are usually also used for cooling. In addition, the bipolar plates ensure an electrically conductive contact to the membrane electrode assemblies.

During the operation of the fuel cell, the fuel (anode operating medium), in particular hydrogen $H_2$ or a hydrogen-containing gas mixture, is supplied via a flow field of the bipolar plate, which is open on the anode side, to the anode, where an electrochemical oxidation of $H_2$ to protons $H^+$ takes place with the discharge of electrons ($H_2 \rightarrow 2\ H^+ + 2\ e^-$). A (water-bound or water-free) transfer of protons from the anode space into the cathode space takes place via the electrolyte or the membrane, which separates and electrically insulates the reaction spaces from each other in a gas-tight manner. The electrons provided at the anode are supplied to the cathode via an electric line. Oxygen or an oxygen-containing gas mixture (for example air) is supplied as the cathode operating medium to the cathode via a flow field of the bipolar plate, which is open on the cathode side, so that a reduction from $O_2$ to $2\ O^{2-}$ takes place with the absorption of the electrons ($\frac{1}{2}O_2 + 2\ e^- \rightarrow O^{2-}$). At the same time, in the cathode space, the oxygen anions react with the protons transferred via the membrane, forming water ($O^{2-} + 2\ H^+ \rightarrow H_2O$).

To supply a fuel cell stack with its operating media, i.e., the reactants, the fuel cell stack includes an anode supply system on the one hand and a cathode supply system on the other hand. The anode supply system includes an anode supply path for supplying an anode operating gas to the anode spaces and an anode exhaust gas path for removing an anode exhaust gas from the anode spaces. Likewise, the cathode supply system includes a cathode supply path for supplying a cathode operating gas to the cathode spaces and a cathode exhaust gas path for removing a cathode exhaust gas from the cathode spaces of the fuel cell stack.

A number of peripheral components (ancillary units) are required to operate a fuel cell stack. Among other things, they may include air conveying means for conveying a cathode gas flow into the cathode (for example an air compressor), a recirculation blower, a cooling water pump, throttle means for influencing flow resistances (for example valves), sensors, etc. The power consumption of these components is referred to as parasitic consumption, since this energy must be provided by the fuel cell stack but is not available to external consumers. Since the current available to external consumers is reduced by the parasitic current, the total efficiency of fuel cell system $\eta_{Sys}$ is always less than the efficiency of fuel cell stack $\eta_{FC}$.

During the operation of a fuel cell, a load-dependent regulation of an air ratio lambda (also known as cathode lambda) takes place, which correlates to an (air) mass flow into the cathode (also known as cathode mass flow), and a boost pressure of a fuel cell (also known as cathode pressure). The boost pressure is the pressure via which the air compressor supplies the cathode operating gas to the cathode.

DE 11 2005 000 767 T5 describes another fuel cell system, which includes an air compressor situated upstream from the cathode, which is driven by a motor so that the air is introduced according to the rotational speed of the motor. The fuel cell system furthermore includes a pressure control valve situated downstream from the cathode, which is controlled in such a way that the pressure is adapted to the air to be supplied to the fuel cell stack. The fuel cell system also includes a recirculation valve, which establishes a connection of the cathode lines upstream from the air compressor and downstream from the pressure control valve. A quantity of humidified air supplied to the fuel cell stack is controlled via the recirculation valve. If it is determined during the operation of the fuel cell system that the flow generation quantity of the fuel cell stack has been increased, the air supply quantity is increased by increasing the rotational speed of the motor of the air compressor. Due to the increase in the rotational speed, the flow rate of the supplied air increases, and the pressures within the fuel cell stack also increase. A pressure sensor detects this increased pressure. On this basis, a control takes place to reduce the pressure by increasing an opening degree of the pressure control valve for the purpose of keeping the pressure constant within the fuel cell stack. If it is determined that the electrical current generated by the fuel cell stack has been reduced during the operation of the fuel cell system, the rotational speed of the motor of the air compressor is reduced. The pressure decreases along with the decreasing rotational speed of the air compressor. The control to increase the pressure value is executed on the basis of the pressure value of the pressure sensor.

Arendt, M; *Regelungstechnische Optimierung der Steuerung eines Brennstoffzellensystems im dynamischen Betrieb* (Optimizing the Control of a Fuel Cell System During Dynamic Operation), Dissertation, Logos Verlag Berlin, 2012, discloses a fuel cell system which includes a fuel cell stack. The fuel cell system furthermore has a cathode supply path and a cathode exhaust gas path. The cathode supply path includes an electrical compressor, a mass flow sensor situated upstream from the compressor, and a pressure sensor at an inlet of the fuel cell stack. The cathode exhaust gas path, i.e., an exhaust gas line of the fuel cell system, has an adjustable throttle element (a throttle valve). The fuel cell system furthermore has a waste path (also referred to as a waste line). The waste path connects the cathode supply path upstream from the conveying means to the cathode exhaust gas path downstream from the exhaust gas throttle means and includes another adjustable throttle element (a waste valve). The waste path also includes a mass flow sensor. An opening of the throttle element in the waste path and a rotational speed of the conveying means (air compressor) are used as manipulated variables to regulate an air mass flow through the fuel cell stack and an air mass flow through the compressor (control variables). To regulate the air pressure at the cathode inlet (i.e., the cathode pressure), it is proposed to use an opening of the throttle element in the cathode exhaust gas path as a manipulated variable.

DE 10 2008 039 407 A1 discloses a similar system structure. Its fuel cell system differs from the above fuel cell system in that the fuel cell system includes a compressor bypass, which branches off in the cathode supply path downstream from the electrically operable compressor and opens into the cathode supply path (into a compressor suction system) upstream from the compressor. The compressor bypass thus does not lead to the surroundings. A mass flow sensor may also be present in the compressor bypass. The compressor bypass furthermore includes a valve element. An opening of the valve element in the compressor bypass and a rotational speed of the electrically operable compressor are used as manipulated variables for setting the air quantity. Once again, a throttle valve is provided in the cathode exhaust gas path to be able to vary the pressure level in the system. The pressure level in the fuel cell may be additionally influenced in this way by changing a flow resistance with the aid of the throttle valve.

Setpoint values for the boost pressure and the cathode lambda (i.e., the cathode mass flow) are generally predefined as a function of the load, i.e., as a function of a load of the fuel cell. The setpoint values may be determined, for example, from characteristic lines. However, the cathode pressure and cathode mass flow typically increase as the load demand increases. A setpoint boost pressure is coupled to an anode pressure (within the anode of the fuel cell). The anode pressure may usually be dynamically adjusted on the basis of a high dynamics of a corresponding component.

In low load ranges or during transient operation, for example downward-transient due to the coupling of the anode and cathode pressures, the system characteristic line of the fuel cell may be outside or in the vicinity of a pump limit of the compressor. This is particularly significant in turbocompressors. If the pump limit is exceeded, a compressor pumping action may set in, which may cause damage to the compressor and must therefore be avoided. In critical operating states, therefore, the (setpoint) air mass flow through the compressor is increased, and the operating point of the compressor is shifted thereby into stable ranges. To ensure a setpoint value sequence (for example, due to a moisture management system in the stack, etc.), the additional air mass flow is blown into the cathode exhaust gas path via the waste path or into the compressor suction system via the bypass path.

A transient operation refers to a change in the operating point of the fuel cell system. An upward-transient operation thus refers to an increase in the load demand on the fuel cell and an associated increase in the cathode mass flow and the cathode pressure. A downward-transient operation thus refers to a reduction in a load demand on the fuel cell and an associated reduction in the cathode mass flow and the cathode pressure.

Numerous disadvantages now result from the known prior art. The electrical compressor is usually the biggest secondary consumer within a fuel cell system, which is why it is a good idea to minimize the power consumption of the electrical compressor. The power consumption may be reduced by removing a preferably small mass flow via the waste path. This must take place while simultaneously maintaining a predefined cathode mass flow and cathode pressure to ensure a good stack efficiency as well as a sufficient service life (read: moisture management) or only a minor degradation of the fuel cell.

A regulation using the above assignment of manipulated values to the control values tends to become unstable, since small changes in the rotational speed of the compressor in the operating range under consideration induce large changes in the mass flow.

Moreover, hot film air mass meters (HFM) are typically used as the air mass meter. If the compressor rotational speed is used as a manipulated variable, as described above, to regulate the cathode mass flow, a measurement noise of the hot film air mass meter causes the power consumption of the compressor to oscillate. This, in turn, results in problems in the power electronics of the compressor.

It is furthermore known that, in some compressors, two possible mass flows of different sizes through the compressor may set in at a constant pressure ratio and a constant rotational speed of the compressor. This results in the fact that there is no clear way to adjust the mass flow as a function of the turbocharger rotational speed and the pressure ratio (formed from the compressor input pressure and compressor output pressure).

SUMMARY OF THE INVENTION

It is an object of the present invention to provide a fuel cell system and a method for operating a fuel cell which eliminate at least one disadvantage of the prior art.

This object is achieved by a fuel cell system and a method for operating a fuel cell system having the features of the independent claims.

The fuel cell system according to the present invention includes a fuel cell, which has a cathode input and a cathode output;

a cathode supply path situated upstream from the cathode input and connected thereto;

a cathode exhaust gas path situated downstream from the cathode output and connected thereto;

a conveying means situated in the cathode supply path for conveying a cathode gas flow into the cathode input and/or an adjustable exhaust gas throttle means, situated in the cathode exhaust gas path, for influencing a flow resistance of the cathode exhaust gas path; and a regulating device, configured to regulate a cathode gas flow and/or a cathode pressure.

It is characteristically provided that the regulating device is configured in such a way that, at least during a stationary and/or upward-transient operation of the fuel cell, a position of the exhaust gas throttle means is a manipulated variable of the regulating device for regulating the cathode gas flow; and/or a rotational speed of the conveying means is a manipulated variable of the regulating device for regulating the cathode pressure.

The present invention is based on a finding, obtained during a system analysis of a fuel cell system, according to which an interaction between the cathode gas flow and the exhaust gas throttle means as well as between the cathode pressure and the rotational speed of the conveying means is the strongest for a given fuel cell system (a given system layout). A particularly robust regulation of the cathode gas flow and/or the cathode pressure is thus achieved by a fuel cell system according to the present invention.

As a result, a relatively high dynamic of an adjustment of the exhaust gas throttle means, compared with the rotational speed of the conveying means, may be used at least during stationary and/or upward-transient operation of the fuel cell system, without exceeding a pump limit of the conveying means.

Compared with the prior art, the regulation is now much more stable, since small changes in the rotational speed of the conveying means induce only slight changes in the pressure ratio, particularly at small pressure ratios (formed from the ratio between a compressor output pressure and a compressor input pressure).

A preferred pressure sensor, which is situated, in particular, between the conveying means and the cathode input in the cathode supply path (preferably at the cathode input), typically has a smaller measurement noise than the hot film mass meter. Oscillations in the power consumption of the compressor during stationary operation may thus be reduced. As a result, a complex signal filtering system may be dispensed with, resulting in a simplification and improvement of the dynamics. A use of simple, standard PID control units (proportional integral differential control units) and a simplification of a pilot control are possible, and a higher control unit amplification may be achieved.

The pressure ratio may furthermore now be clearly set via the rotational speed of the conveying means at a predetermined mass flow through the compressor.

The fuel cell includes, in particular, at least one individual cell which has an anode space and a cathode space. The anode space and the cathode space are preferably separated from each other by a membrane (in particular a polymer electrolyte membrane; PEM for short). The fuel cell is preferably a fuel cell stack. Fuel cell stacks of this type include a large number of individual cells.

The cathode input typically establishes a connection between a cathode space of the fuel cell and components of the cathode supply path situated upstream. The cathode output typically establishes a connection between a cathode space of the fuel cell and components of a cathode exhaust gas path (of a cathode exhaust gas system) of the fuel cell system situated downstream.

The cathode supply path and the cathode exhaust gas path may be designed as lines, for example pipes or hoses. The cathode supply path is typically fluidically (fluid-conductively) connected to the cathode input, while the cathode exhaust gas path is typically fluidically connected to the cathode output.

The conveying means for conveying the cathode gas flow into the cathode input is, in particular, a compressor, preferably a turbocompressor. The turbocompressor may be part of a turbocharger. A turbine may furthermore be provided in the cathode exhaust gas path, in particular a variable turbine having a variable turbine geometry (VTG), which is, in particular, part of the turbocharger. The conveying means is preferably electrically driven, whereby the rotational speed of the conveying means may be easily set.

The regulating device includes, in particular, at least one control unit. The regulating device may furthermore include one control unit each for regulating the cathode gas flow and the cathode pressure. The regulating device is designed, in particular, for a regulating task with the aid of a multiple input, multiple output (MIMO) system having strong interconnections.

According to the system according to the present invention, in other words, the exhaust gas throttle means is an actuator of the regulating device for regulating a cathode gas flow, and/or the conveying means is an actuator of the regulating device for regulating the cathode pressure, at least during a stationary and/or upward-transient operation of the fuel cell.

A transient operation refers to a change in the operating point of the fuel cell and thus of the fuel cell system. An upward-transient operation thus refers to an increase in a load demand on the fuel cell (or a load of the fuel cell) and, in particular, an associated increase in the cathode gas flow and the cathode pressure. A downward-transient operation thus refers to a decrease in a load demand on the fuel cell and, in particular, an associated decrease in the cathode gas flow and the cathode pressure. A stationary operation refers to a constant load demand on the fuel cell.

The cathode gas flow may be a cathode gas volume flow (in particular, a cathode air volume flow, i.e., an air volume flow) and/or a cathode gas mass flow (in particular, a cathode air mass flow, i.e., an air mass flow).

According to the present invention, the position of the exhaust gas throttle means is thus assigned as a manipulated variable for regulating the cathode gas flow (which represents a setpoint variable), and/or the rotational speed of the conveying means is assigned as a manipulated variable for regulating the cathode pressure (which represents another setpoint variable), during stationary or upward-transient operation.

This assignment of the manipulated variables for regulating the cathode gas flow or the cathode pressure may also be used for a downward-transient operation. However, the regulating device is preferably configured in such a way that, during a stationary and/or downward-transient operation of the fuel cell, the rotational speed of the conveying means is a manipulated variable of the regulating device for regulating the cathode gas flow; and/or the position of the exhaust gas throttle means is a manipulated variable of the regulating device for regulating the cathode pressure.

In other words, the conveying means is thus an actuator of the regulating device for regulating a cathode gas flow, and/or the exhaust gas throttle means is an actuator of the regulating device for regulating the cathode pressure during a downward-transient operation of the fuel cell. Due to this assignment, advantages result during the downward-transient operation due to the utilization of advantages of the particular system components (conveying means and exhaust gas throttle means). The advantages result, in particular, from the relatively high dynamics of the exhaust gas throttle means compared to the conveying means. During downward-transient operation, the rotational speed of the conveying means is consequently assigned as a manipulated variable for regulating the cathode gas flow (which represents a setpoint variable), and/or the position of the exhaust gas throttle means is assigned as a manipulated variable for regulating the cathode pressure (which represents another setpoint variable).

Differentiation of the load type (stationary, upward-transient or downward-transient) is preferably checked with the aid of a logic, which may be integrated into a controller of the fuel cell system. Limiting values, if, when exceeded, result in an upward-transient or downward-transient operation instead of a stationary operation, are stored, in particular, in a memory of the controller.

The fuel cell system preferably includes a waste path, which connects the cathode supply path downstream from the conveying means to the cathode exhaust gas path downstream from the exhaust gas throttle means, and which includes an adjustable waste throttle means for influencing a flow resistance of the waste path. The regulating device is preferably configured in such a way that a position of the waste throttle means is another manipulated variable of the regulating device for regulating the cathode gas flow. Additionally or alternatively, the fuel cell system may include a bypass path, which connects the cathode supply path downstream from the conveying means to the cathode supply path upstream from the conveying means, and which includes an adjustable bypass throttle means for influencing a flow resistance of the bypass path. The regulating device is preferably configured in such a way that a position of the bypass throttle means is another manipulated variable of the regulating device for regulating the cathode gas flow. In other words, the waste throttle means and/or the bypass throttle means is/are each another actuator for regulating the cathode gas flow. The position of the waste throttle means and/or the position of the bypass throttle means thus each act as another manipulated variable of the regulating device for regulating the cathode gas flow. As a result, the conveying means may be operated with a greater gas flow through the conveying means (flow rate) to achieve a predetermined pressure ratio without this causing the cathode gas flow to increase. This is possible, since the part of the gas flow through the conveying means which is not conducted into the fuel cell flows through the waste path or the bypass path. A drying out of the fuel cell is thus prevented despite a higher gas flow through the conveying means. In upward-transient, downward-transient and/or stationary operation, the position(s) of the waste throttle means and/or the bypass throttle means is/are each assigned as another manipulated variable for regulating the cathode gas flow (which represents a setpoint variable). Depending on the regulation of the cathode gas flow, the position of the waste throttle means thus results as the manipulated variable for regulating a waste gas flow (as a setpoint variable) through the waste path. Similarly, depending on the regulation of the cathode gas flow, the position of the bypass throttle means thus results as the manipulated variable for regulating a bypass gas flow (as a setpoint variable) through the bypass path.

The exhaust gas, waste and/or bypass throttle means is/are, in particular, a throttle valve or a valve, whereby it is easily possible to influence the flow resistance of the particular path. The position of a throttle means may thus be an opening angle of the particular throttle valve.

In particular, the fuel cell system includes a charge air cooler, a humidifier, a moisture exchanger, a humidifier bypass valve, in particular including an adjustable throttle element (bypass valve), and/or a sensor for measuring the moisture at the cathode input (stack inlet).

A vehicle which includes a fuel cell system according to the present invention is also provided. Like the fuel cell system, the vehicle is characterized by a long service life.

A method for operating a fuel cell system is also provided, the fuel cell system including:

a fuel cell, which has a cathode input and a cathode output;

a cathode supply path situated upstream from the cathode input and connected thereto;

a cathode exhaust gas path situated downstream from the cathode output and connected thereto;

a conveying means situated in the cathode supply path for conveying a cathode gas flow into the cathode input and/or an adjustable exhaust gas throttle means, situated in the cathode exhaust gas path, for influencing a flow resistance of the cathode exhaust gas path; and a regulating device, configured to regulate the cathode gas flow and/or a cathode pressure, characterized in that the method includes the following steps at least during a stationary and/or upward-transient operation of the fuel cell:

regulating a cathode gas flow by varying a position of the exhaust gas throttle means; and/or regulating a cathode pressure by varying a rotational speed of the conveying means.

Due to the fact that the position of the exhaust gas throttle means is varied, the flow resistance in the cathode exhaust gas path is varied. Reducing a flow resistance in a path (exhaust gas, waste and/or bypass path) may be effectuated, in particular, by increasing a flow cross section in the path. This, in turn, may take place by opening the throttle means (for example, a throttle valve). Conversely, an increase in the flow resistance may be effectuated, in particular, by reducing the flow cross section by closing the throttle means.

To implement a control loop, the regulation of the cathode gas flow preferably includes a step of ascertaining an instantaneous cathode gas flow, and the regulation of the cathode gas flow takes place as a function of the ascertained cathode gas flow. In particular, the regulation takes place as a function of the ascertained, instantaneous cathode gas flow and a setpoint cathode gas flow. The regulation may then take place as a function of a difference between the two cathode gas flows. The ascertainment of the cathode gas flow may take place, in particular, with the aid of an air mass meter, which is preferably situated upstream from the conveying means.

To implement a control loop, the regulation of the cathode gas flow furthermore preferably includes a step of ascertaining an instantaneous cathode pressure, and the regulation of the cathode pressure takes place as a function of the ascertained cathode pressure. In particular, the regulation takes place as a function of the ascertained, instantaneous cathode pressure and a setpoint cathode pressure. The regulation may then take place as a function of a difference between the two cathode pressures. The ascertainment of the cathode pressure may take place, in particular, with the aid of a pressure sensor, which is preferably situated between the conveying means and the cathode input, particularly preferably at the cathode input.

An ambient temperature and/or ambient pressure compensation of the specified setpoint values preferably takes place. Influences of the ambient temperature and/or the ambient pressure on the cathode gas flow and/or the cathode pressure are thus compensated for.

An increase in the cathode gas flow preferably occurs during the upward-transient operation of the fuel cell. More oxygen for a fuel cell reaction is available thereby. In particular, to increase the cathode gas flow, the method includes a step of at least temporarily reducing the flow resistance of the cathode exhaust gas path by varying the position of the exhaust gas throttle means. Thus, the exhaust gas throttle means is, in particular, opened to increase a flow cross section. Due to the assignment according to the present invention of the position of the exhaust gas throttle means as a manipulated variable for regulating the cathode gas flow, the flow resistance is now reduced for the purpose of increasing the cathode gas flow. Due to the fact that the position of the exhaust gas throttle means may be relatively quickly varied, compared to the rotational speed of the conveying means, the gas flow also increases relatively quickly, so that an instantaneous operating point moves away from the pump limit.

An increase in the cathode pressure furthermore preferably occurs during the upward-transient operation of the fuel cell. As a result, a higher anode pressure may be selected, i.e., more anode gas may be applied to the anode space without a maximum permissible pressure difference between the two sides of a membrane of the fuel cell being exceeded. In particular, to increase the cathode pressure, the method includes a step of increasing the rotational speed of the conveying means. By increasing the rotational speed, the boost pressure of the conveying means and thus also the cathode pressure increase. Due to the fact that the rotational speed of the conveying means is relatively sluggish, compared to the position of the exhaust gas throttle means, a pressure rise so rapid that the pump limit is exceeded is avoided.

This is particular advantageous if the cathode gas flow and also the cathode pressure are to be increased simultaneously during an upward-transient operation and the flow resistance is reduced and the rotational speed increased at the same time. Since the exhaust gas throttle means reacts more dynamically than the conveying means, the cathode gas flow increases more rapidly than the cathode pressure. Since the exhaust gas throttle means is already opened when the conveying means is still accelerating, the risk of compressor pumping is eliminated. The increase in the rotational speed of the conveying means to a setpoint rotational speed, due to the reduced flow resistance, is furthermore accelerated. In addition, the flow resistance may be preferably already reduced before the rotational speed is increased, so that a rise in the cathode pressure is suppressed before the cathode gas flow increases.

The step of at least temporarily reducing the flow resistance of the cathode exhaust gas path particularly preferably occurs at the beginning of a time period of the step of increasing the rotational speed of the conveying means. The cathode gas flow is thus increased as early as the beginning of the increase in the rotational speed of the conveying means. As a result, an operating point at low load, which represents a start operating point of the upward-transient operation, may be placed close to the pump limit without running the risk of exceeding the pump limit. An improved efficiency of the fuel cell system is thus facilitated, since an efficiency of conveying means 32 is usually at its maximum in the range of pump limit PG.

According to one preferred embodiment of the present invention, the method includes a step of increasing the flow resistance of the cathode exhaust gas path by varying the position of the exhaust gas throttle means after the step of at least temporarily reducing the flow resistance of the cathode exhaust gas path by varying the position of the exhaust gas throttle means. The exhaust gas throttle means is thus at least partially closed. As a result, after the conveying means has reached its setpoint rotational speed, the cathode gas flow may by limited to a (maximum) setpoint, in particular already during the increase in the rotational speed.

The method preferably includes the following steps during a downward-transient operation:
regulating a cathode gas flow by varying the rotational speed of the conveying means; and/or
regulating the cathode pressure by varying the position of the exhaust gas throttle means.

During downward-transient operation, advantages which are similar to the reverse assignment of the manipulated variables to the setpoint variables during upward-transient operation are achieved thereby.

Preferably, during downward-transient operation of the fuel cell,
a reduction of the cathode gas flow takes place, and the method includes a step of reducing the rotational speed for the purpose of reducing the cathode gas flow; and/or
a reduction of the cathode pressure takes place, and the method includes a step of at least temporarily reducing the flow resistance of the cathode exhaust gas path by varying the position of the exhaust gas throttle means.

Due to the higher dynamics of the exhaust gas throttle means, compared to the dynamics of the conveying means, an exceedance of the pump limit is thus prevented.

In downward-transient operation as well, the at least temporary reduction in the flow resistance of the cathode exhaust gas path preferably takes place at the beginning of a time period of the reduction in the rotational speed of the conveying means. The cathode gas flow is thus increased as early as the beginning of the reduction in the rotational speed of the conveying means. As a result, an operating point at high load, which represents a start operating point of the downward-transient operation, may be placed close to the pump limit without running the risk of exceeding the pump limit. An improved efficiency of the fuel cell system is facilitated thereby.

A preferred reduction in the flow resistance of the cathode exhaust gas path thus takes place both in upward-transient and in downward-transient modes.

According to one preferred embodiment of the present invention, the method includes a step of increasing the flow resistance of the cathode exhaust gas path by varying the position of the exhaust gas throttle means after the step of at least temporarily reducing the flow resistance of the cathode exhaust gas path by varying the position of the exhaust gas throttle means. The exhaust gas throttle means is thus at least partially closed. As a result, after the conveying means has reached its setpoint rotational speed, the cathode pressure may be limited to a (minimum) setpoint, in particular already during the decrease in the rotational speed.

In one preferred embodiment of the present invention, the fuel cell system
has a waste path, which connects the cathode supply path downstream from the conveying means to the cathode exhaust gas path downstream from the exhaust gas throttle means and includes an adjustable waste throttle means for influencing a flow resistance of the waste path, and the method includes a step of regulating the cathode gas flow by varying a position of the waste throttle means; and/or
has a bypass path, which connects the cathode supply path downstream from the conveying means to the cathode supply path upstream from the conveying means and includes an adjustable bypass throttle means for influencing a flow resistance of the bypass path, and the method includes a step of regulating the cathode gas flow by varying a position of the bypass throttle means.

Another option thus exists for ensuring a sufficient cathode gas flow to avoid exceeding the pump limit of the conveying means, in particular at low loads of the fuel cell and thus low cathode pressures. During downward-transient operation of the fuel cell, an excessively large cathode gas flow may also be prevented, which would otherwise occur due to the relatively slow decrease in the rotational speed of the conveying means.

In particular, during stationary, upward-transient and/or downward-transient operation, the regulation of the cathode gas flow and/or the cathode pressure may take place as a function of a maximum permissible pressure difference between the cathode pressure and an anode pressure so that a membrane of the fuel cell is not damaged. In particular, the varying of the position of the exhaust gas throttle means or the throttle means furthermore preferably takes place as a function of the pressure difference. Damage to the membrane is prevented thereby, despite the relatively high dynamics of the throttle means.

The different specific embodiments of the present invention mentioned in this application may be advantageously combined with each other unless otherwise indicated in the individual case.

BRIEF DESCRIPTION OF THE DRAWINGS

The present invention is explained below in exemplary embodiments on the basis of the associated drawings.

DETAILED DESCRIPTION

Figure 1:
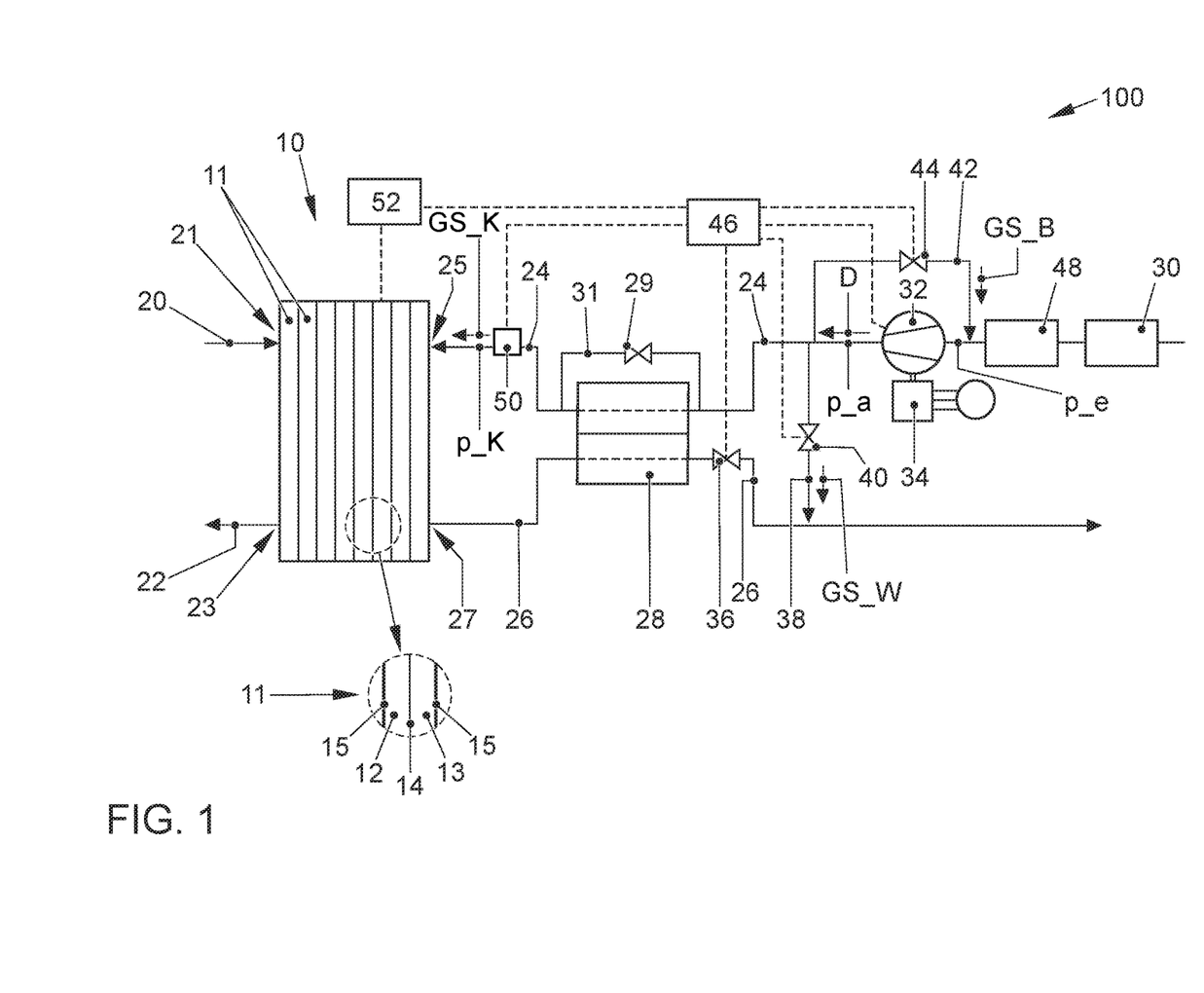
FIG. 1 shows a block diagram of a fuel cell system according to one preferred embodiment.

FIG. 1 shows a fuel cell system which is designated as a whole by reference numeral 100, according to one preferred embodiment of the present invention. Fuel cell system 100 is part of a vehicle, which is not illustrated in greater detail, in particular an electric vehicle, which includes an electric traction motor, which is supplied with electrical energy by fuel cell system 100.

Fuel cell system 100 includes a fuel cell 10 as the core component in the form of a fuel cell stack 10, which includes a large number of individual cells 11 situated in the shape of a stack, which are formed by alternately stacked membrane electrode assemblies (MEA) 14 and bipolar plates 15 (see detail). Each individual cell 11 thus includes one MEA 14, which has an ion-conductive polymer electrolyte membrane, which is not illustrated in greater detail here, as well as catalytic electrodes situated on both sides thereof, namely an anode and a cathode, which catalyze the particular partial reaction of the fuel cell conversion and may be designed, in particular, as coatings on the membrane. The anode and cathode electrodes include a catalytic material, for example platinum, which is supported on an electrically conductive carrier material having a large specific surface, for example a carbon-based material. An anode space 12 is thus formed between a bipolar plate 15 and the anode and between the cathode and next bipolar plate 15 of cathode space 13. Bipolar plates 15 are used to supply the operating media to anode and cathode spaces 12, 13 and also establish an electrical connection between individual fuel cells 11. Gas diffusion layers may be optionally situated between membrane electrode assemblies 14 and bipolar plates 15.

Fuel cell 10 (specifically its anode spaces 12) is supplied with anode gas (in particular hydrogen) through an anode supply path 20 of fuel cell system 100. Anode supply path 20 is connected to an anode input 21 of fuel cell 10. An anode exhaust gas path 22 of fuel cell system 100 is connected to an anode output 23 of fuel cell 10. During the operation of fuel cell system 100, unreacted anode gas is removed via anode exhaust gas path 22 and subsequently fed back to anode supply path 20 via a recirculation system of fuel cell system 100, which is not illustrated.

Fuel cell 10 (specifically its cathode spaces 13) is supplied with a cathode gas (in particular air) through a cathode supply path 24 of fuel cell system 100. Cathode supply path 24 is connected to a cathode input 25 of fuel cell 10. A cathode exhaust gas path 26 of fuel cell system 100 is connected to a cathode output 27 of fuel cell 10. During operation, unreacted cathode gas and reaction products (in particular water) are removed via cathode exhaust gas path 26 and released into the surroundings of fuel cell system 100.

A moisture exchanger 28 (also referred to as a humidifier) of fuel cell system 100 may be situated in cathode supply path 24 and cathode exhaust gas path 26, which transfers water from cathode exhaust gas path 26 to cathode supply path 24. A humidifier bypass valve 29 may be provided in a humidifier bypass path 31 to bypass moisture exchanger 28. A charge air cooler (a heat exchanger, which is not illustrated) may also be provided between waste path 38 and humidifier bypass path 31 in cathode supply path 24.

Moreover, an air filter 30 may be situated in cathode supply path 24 for the purpose of filtering particles out of the cathode gas. Air filter 30 is advantageously situated upstream from a conveying means 32 of fuel cell system 100, which is also situated in cathode supply path 24, for the purpose of conveying the cathode gas into fuel cell 10. Conveying means 32 may be, for example, a compressor 32; in the present case, compressor 32 is a turbocompressor 32, i.e., a turbomachine. The present turbocompressor 32 is electrically driven during operation and includes an electric motor 34 for this purpose.

Fuel cell system 100 also includes an adjustable exhaust gas throttle means 36 for influencing a flow resistance of cathode exhaust gas path 26. Exhaust gas throttle means 36 is situated in cathode exhaust gas path 26. As is apparent in FIG. 1, exhaust gas throttle means 36 may be situated downstream from moisture exchanger 28.

Fuel cell system 100 may also have a waste path 38. Waste path 38 connects cathode supply path 24 downstream from conveying means 32 to cathode exhaust gas path 26 downstream from the exhaust gas throttle means and includes an adjustable waste throttle means 40 for influencing a flow resistance of waste path 38.

Fuel cell system 100 may have a bypass path 42 in addition to or as an alternative to waste path 38. Bypass path 42 connects cathode supply path 24 downstream from conveying means 32 to cathode exhaust gas path 26 upstream from conveying means 32 and includes an adjustable bypass throttle means 44 for influencing a flow resistance of bypass path 42.

Throttle means 36, 40, 44 influence the flow resistance, in particular, by influencing a (free) flow cross section of particular path 26, 38, 42. The present throttle means 36, 40, 44 are throttle valves.

Fuel cell system 100 furthermore includes a regulating device 46, which is configured to regulate a cathode gas flow GS_K and/or a cathode pressure p_K. Cathode gas flow GS_K is typically a cathode gas mass flow, i.e., a mass flow (typically an air mass flow), which flows into the cathode, i.e., cathode spaces 13, of fuel cell 10 during the operation of fuel cell 10. Cathode pressure p_K is the pressure of the cathode gas in cathode spaces 13 of the fuel cell. Regulating device 46 is connected to conveying means 32, exhaust gas throttle means 36, waste throttle means 40 and bypass throttle means 44 in such a way that regulating device 46 is able to vary a rotational speed n (see FIGS. 2 through 5) of conveying means 32 and a position S (also see FIGS. 2 through 5) of throttle means 36, 40 and 44 during the operation of fuel cell system 100.

Fuel cell system 100 includes an air mass meter 48, for example a hot film air mass meter, for the purpose of measuring cathode gas flow GS_K. Fuel cell system 100 includes a pressure sensor 50 for the purpose of measuring cathode pressure p_K. The fuel cell system may also include other air mass meters, which are not illustrated, in waste path 38 and in bypass path 42. Pressure sensor 50 of air mass meter 48 and possibly also the additional air mass meters are connected to regulating device 46 in such a way that measured values are transmittable from pressure sensor 50 and the air mass meters to regulating device 46.

Fuel cell system 100 furthermore includes a controller 52, which is responsible for regulating a load of fuel cell 10. Controller 52 may also include a logic, which is able to determine a load case. Controller 52 may thus output a piece of information to regulating device 46, indicating whether the operation of fuel cell 10 is a stationary, an upward-transient or a downward-transient one.

In a stationary or upward-transient operation of fuel cell 10, i.e., with a constant or increasing load demand on fuel cell 10, a position S of exhaust gas throttle means 36 is a manipulated variable of regulating device 46 for regulating cathode gas flow GS_K, for example the cathode gas mass flow (often also referred to as the cathode mass flow). This means that exhaust gas throttle means 36 acts as an actuator in the regulation of cathode gas flow GS_K. A rotational speed n of a conveying means 32 is also a manipulated variable of regulating device 46 for regulating the cathode pressure p_K. This means that conveying means 32 acts as an actuator in the regulation of cathode pressure p_K.

In a downward-transient operation of fuel cell 10, i.e., with a decreasing load demand on fuel cell 10, however, it is advantageous if rotational speed n of conveying means 32 is a manipulated variable of regulating device 46 for regulating cathode gas flow GS_K (cathode mass flow, for example), and conveying means 32 thus acts as an actuator for regulating the cathode gas mass flow. During downward-transient operation, a position S of exhaust gas throttle means 36 may also be a manipulated variable of regulating device 46 for regulating cathode pressure p_K. Exhaust gas throttle means 36 thus acts as an actuator for regulating cathode pressure p_K.

In stationary, upward-transient as well as downward-transient mode, a position of the waste throttle means and/or a position of the bypass throttle means may be additional manipulated variables of the regulating device for regulating cathode gas flow GS_K.

Figure 2:
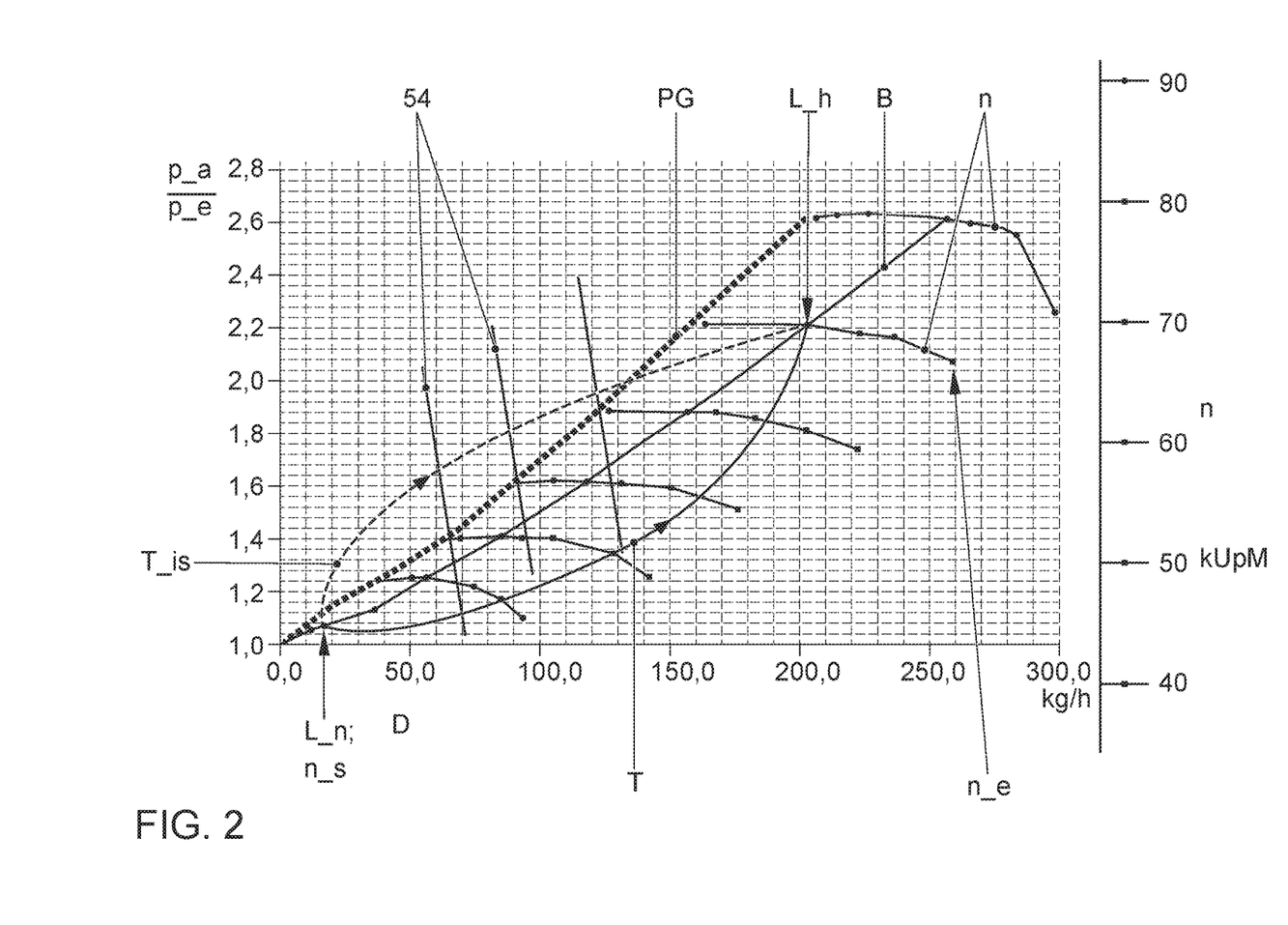
FIG. 2 shows a characteristic map of a preferred conveying means during an upward-transient operation.

FIG. 2 shows a diagram of a conveying means 32, a compressor diagram of a turbocompressor 32 in the present case. Lines of constant rotational speed n (in krpm, i.e., a thousand rotations per minute) of conveying means 32 are thus illustrated in FIG. 2. Lines 54 of constant rotational speed n of a screw-type compressor are furthermore illustrated in FIG. 2 only for comparison. FIG. 2 also shows a pressure ratio p_a/p_e between a compressor output pressure p_a and a compressor input pressure p_e and a flow rate D (in kg/h, i.e., kilograms per hour) through compressor 32, a mass flow in the present case. A pump limit PG forms a limit in the known manner between a range in which conveying means 32 is (continuously) operable and a range in which a return flow through conveying means 32 occurs. If pressure ratio p_a/p_e is increased and/or flow rate D reduced, starting from pump limit PG, pump limit PG is exceeded. If pressure ratio p_a/p_e is reduced and/or flow rate D increased, starting from pump limit PG, conveying means 32 is in a stable operating range.

An operating characteristic line B of fuel cell 10 is furthermore illustrated in FIG. 2. Operating characteristic line B indicates a required or desired pressure ratio p_a/p_e at a predetermined flow rate D. Flow rate D (as a mass flow) corresponds to cathode gas flow GS_K if there is no mass flow through bypass and waste paths 42, 38 and if water transfer in moisture exchanger 28 is negligible. Pressure ratio p_a/p_e is proportional to cathode pressure p_K.

Two transients during an upward-transient operation of fuel cell 10 from a relatively low load L_n to a relatively high load L_h are also illustrated. An unstable transient L_is at an exceeded pump limit is illustrated by the broken line. A transient of this type may set in during a regulation according to the prior art, if a rotational speed of conveying means 32 is used as a manipulated variable for regulating the cathode gas flow and a position S of exhaust gas throttle means 36 is a manipulated variable for regulating cathode pressure p_K. Namely, if a sudden change from low load L_n to high load L_h is to occur, the flow resistance is increased with the aid of exhaust gas throttle means 36 for the purpose of increasing cathode pressure p_K. Exhaust gas throttle valve 36 thus closes. In addition, rotational speed n of conveying means 32 is increased to increase cathode gas flow GS_K. However, since position S of exhaust gas throttle means 36 is much more rapidly adjustable than rotational speed n of conveying means 32, cathode pressure p_K rises faster than cathode mass flow-pump limit PG is exceeded.

According to the present invention, this is avoided in that, during the upward-transient and/or stationary operation of the fuel cell, position S of exhaust gas throttle means 36 is a manipulated variable for regulating cathode gas flow GS_K, and rotational speed n of conveying means 32 is a manipulated variable for regulating cathode pressure p_K.

Figure 3:
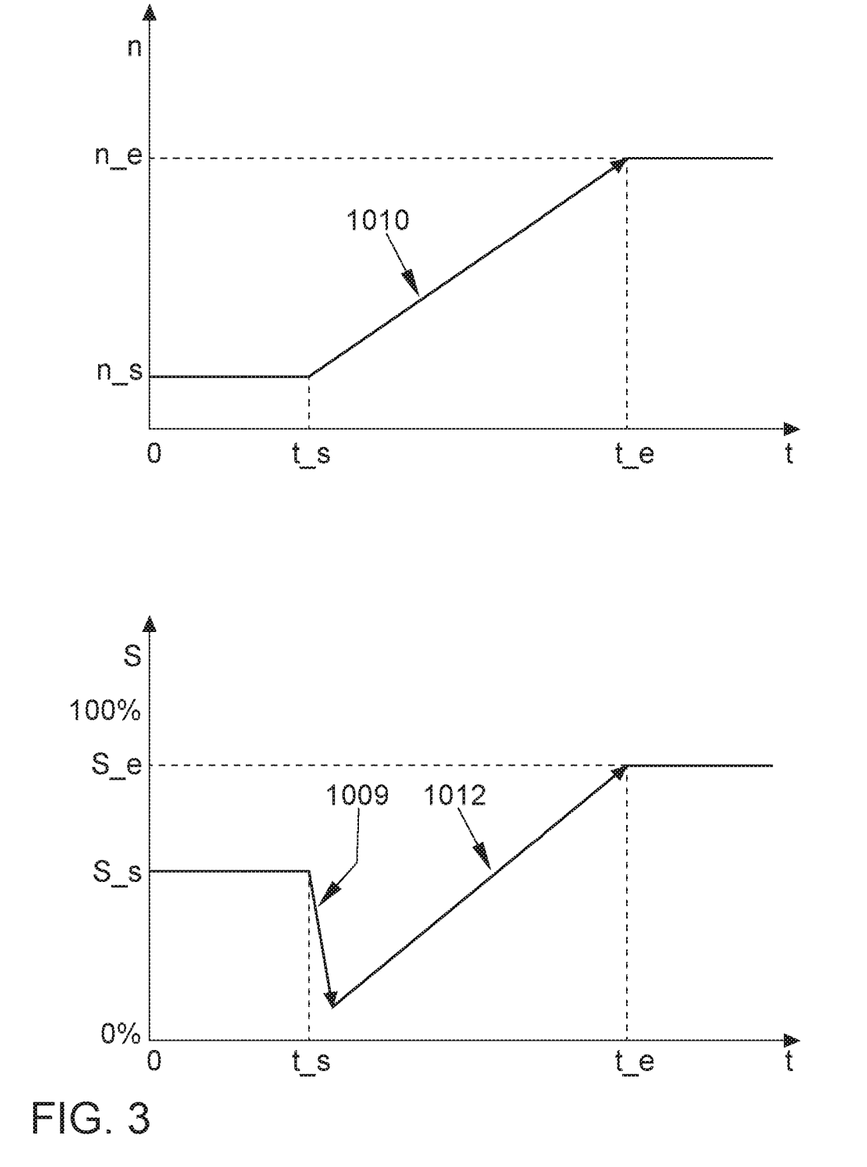
FIG. 3 shows a schematic representation of the manipulated variables during the upward-transient operation.

FIG. 3 schematically illustrates curves of rotational speed n of conveying means 32 and position S of exhaust gas throttle means 36, over time t in each case. At a start point in time t_s, controller 52 tells regulating device 46 that a load increase of fuel cell 10 is to take place. Controller 52 and regulating device 46 may be combined into a single unit. To increase the load, starting from a start point in time t_s, the load is preferably rapidly increased from low load L_n (at a relatively low cathode gas flow GS_K and a relatively low cathode pressure p_K) to high load L_h (at a relatively high cathode gas flow GS_K and a relatively high cathode pressure p_K). This is completed at end point in time t_e.

To increase cathode pressure p_K, regulating device 46 carries out a regulation of cathode gas flow GS_K by varying position S of exhaust gas throttle means 36, while regulating device 46 carries out a regulation of cathode pressure p_K by varying rotational speed n of conveying means 32.

The regulation of cathode gas flow GS_K takes place in a stationary, upward-transient as well as downward-transient operation, based on a measured value of air mass meter 48, which supplies an instantaneous actual value for cathode gas flow GS_K to regulating device 46, and based on a setpoint value for position S, i.e., end position S_e. The regulation of the cathode gas flow takes place on the basis of a measured value of pressure sensor 50, which supplies an instantaneous actual value for cathode pressure p_K to regulating device 46, and on the basis of a setpoint value for rotational speed n, i.e., an end rotational speed n_e. The regulation takes place starting at a start rotational speed n_s.

In FIG. 3, a position of 0% symbolizes a position S in which exhaust gas throttle means 36 has the lowest flow resistance, i.e., the largest free flow cross section. Moreover, a position of 100% symbolizes a position S having the highest flow resistance, i.e., the smallest free flow cross section.

An increase in rotational speed n of conveying means 32 now takes place to regulate cathode pressure p_K. At the same time, a reduction in the flow resistance of cathode exhaust gas path 26 takes place by varying position S of exhaust gas throttle means 36 to increase cathode gas flow GS_K.

Since position S of throttle means 36 is much more dynamically variable than rotational speed n of the conveying means, the reduction in the flow resistance of cathode exhaust gas path 26 already takes place at the beginning of a time period (t_s to t_e) of the increase in rotational speed n of conveying means 32. As a result, a reduction in pressure ratio p_a/p_e takes place and not an increase in pressure ratio p_a/p_e. The pressure ratio may also remain largely constant at the beginning of the regulation (see transient T in FIG. 2). As rotational speed n of conveying means 32 increases, so does cathode pressure p_K, and position S of exhaust gas throttle means 36 is also adjusted, so that cathode gas flow GS_K does not become too high. Depending on the design of the fuel cell system, an end position S_e of exhaust gas throttle element 36 may occur at end point in time t_e, i.e., upon reaching end rotational speed n_e, which has a higher or lower flow resistance than a start position S_s of exhaust gas throttle means 36. In the illustrated example, end position S_e has a higher flow resistance than start position S_s. A step of increasing the flow resistance of cathode exhaust gas path 26 by varying position S of exhaust gas throttle means 36 thus takes place after the reduction in the flow resistance of cathode exhaust gas path 26.

This regulation of cathode gas flow GS_K and cathode pressure p_K causes the load to increase from low load L_n to high load L_h without exceeding pump limit PG. Instead, transient T moves away from pump limit PG, whereby a safer operation of conveying means 32 is ensured.

Figure 4:
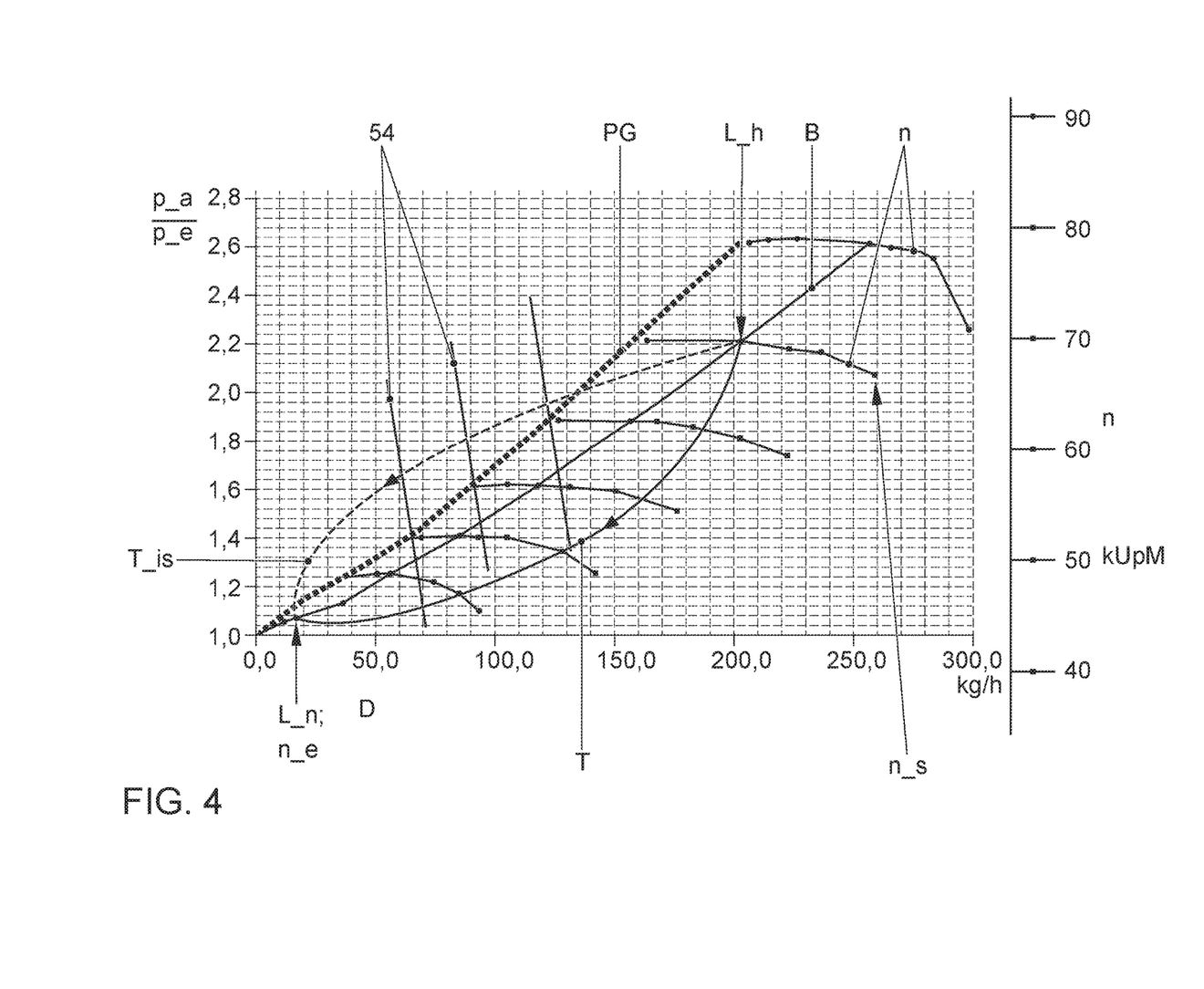
FIG. 4 shows a characteristic map of a preferred conveying means during an downward-transient operation.

FIG. 4 differs from FIG. 2 in that a downward-transient operation of fuel cell system 100 is illustrated. During the downward-transient operation, a demand of cathode gas flow GS_K is reduced and, in parallel thereto, also a demand of cathode pressure p_K. If position S of the exhaust gas throttle means were a manipulated variable for regulating cathode gas flow GS_K and if rotational speed n of conveying means 32 were a manipulated variable for regulating cathode pressure p_K, pump limit PG would be breached (see transient T_is), since the flow rate (mass flow) is reduced relatively quickly at a high pressure level. This is due to the fact that exhaust gas throttle means 36 increases the flow resistance more rapidly (for example, exhaust gas throttle valve 36 closes) than the turbocharger is able to reduce rotational speed n.

An ideal response to this situation has been found in that, during the downward-transient operation, a regulation of cathode gas flow GS_K takes place by varying rotational speed n of conveying means 32 and regulating cathode pressure p_K takes place by varying position S of exhaust gas throttle means 36. Due to the fact that, during the downward-transient operation, exhaust gas throttle means 36 adjusts cathode pressure p_K (the pressure level) and conveying means 32 adjusts cathode gas flow GS_K, the flow resistance is reduced faster, i.e., exhaust gas throttle means 36 opens faster, than rotational speed n of conveying means 32 decreases, i.e., conveying means 36 decelerates. As a result, pressure ratio p_a/p_e is reduced, and a safe distance from pump limit PG is ensured—see transient T.

Figure 5:
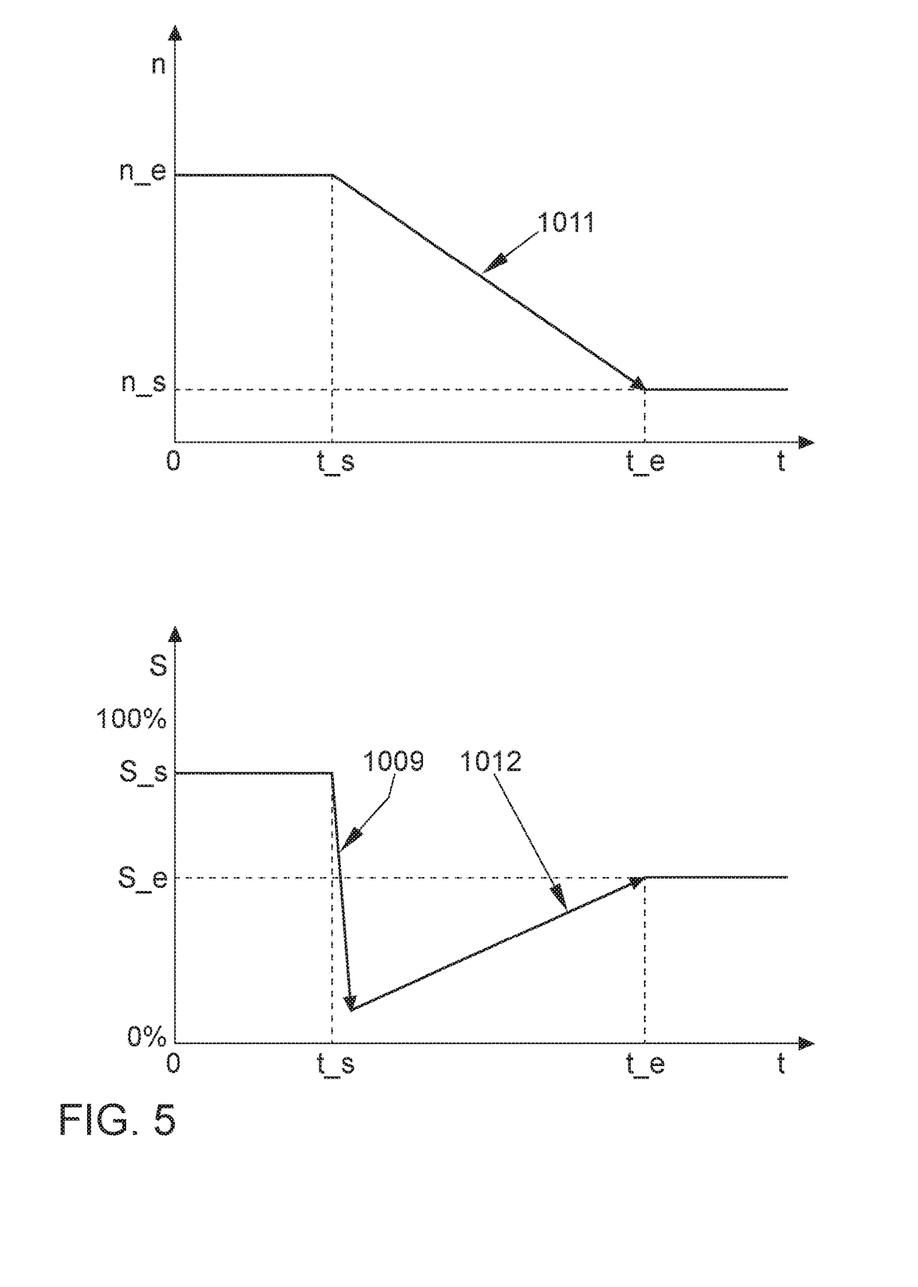
FIG. 5 shows a schematic representation of the manipulated variables during the downward-transient operation.

This correlation between rotational speed n of conveying means 32 and position S of exhaust gas throttle means 36 is illustrated in FIG. 5. It is also apparent therefrom how exhaust gas throttle means 36 reduces the flow resistance in cathode exhaust gas path 26 as early as the beginning of the reduction of rotational speed n, i.e., after start point in time t_s—exhaust gas throttle means 36 thus opens. Exhaust gas throttle means 36 may then be at least partially closed again by the regulating device, i.e., the flow resistance may be increased, so that a desired cathode pressure p_K sets in at end point in time t_e.

An increase in flow rate D effectuated by reducing the flow resistance (and thus also the cathode mass flow without any additional measures) may be prevented by reducing the flow resistance in waste path 38 or bypass path 42. A regulation of cathode gas flow GS_K thus also occurs by varying a position of waste throttle means 40 and/or bypass throttle means 44. An increase in cathode gas flow GS_K, which would otherwise occur, may thus be compensated for by additionally opening waste throttle means 40 (waste gate) and/or bypass throttle means 44, so that a good setpoint value sequence of cathode gas flow GS_K is ensured. This takes place, in particular, during a time period (t_s-t_e) for reducing rotational speed n of conveying means 32.

Cathode gas flow GS_K results from a difference between the flow rate of conveying means 32 and a waste gate flow GS_W, which is removed via waste path 38, and/or a bypass gas flow GS_B, which is removed via bypass path 42. A difference of measured values from mass flow sensor 48 and the mass flow sensors in waste path 38 and/or bypass path 42 may thus be formed to determine cathode gas flow GS_K. Additionally or alternatively, cathode gas flow GS_K may also be calculated with the aid of an (arithmetic) model and the measured value upstream from conveying means 32 (at a compressor inlet).

It is particularly advantageous if a compressor bypass, i.e., waste path 38 or bypass path 42, may be dispensed with altogether. This is possible if flow rate D already corresponds to a desired cathode gas flow GS_K (mass flow) through fuel cell 10 at particular pressure ratio p_a/p_e. This may be achieved, for example, by adapting the compressor characteristic map or by adapting the setpoint settings for fuel cell 10. Advantages result therefrom with regard to a reduced complexity, i.e., a simplification of fuel cell system 100, the regulation, controller 32 and ultimately the costs.

Figure 6:
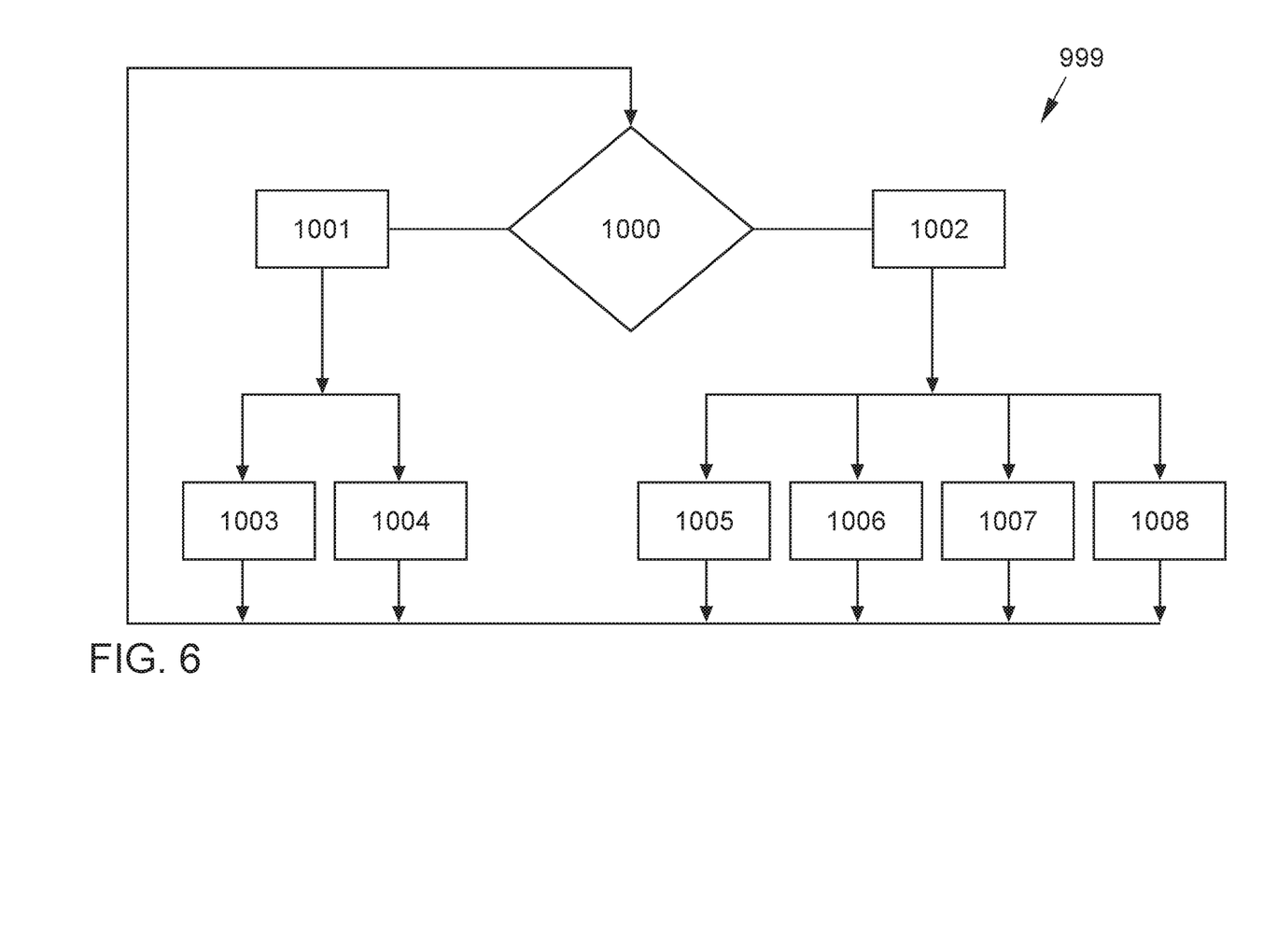
FIG. 6 shows a schematic sequence of one preferred method.

FIG. 6 shows a schematic sequence of a method 999 according to one preferred embodiment of the present invention. Accordingly, a determination of an operating state of fuel cell 10 (for example, with the aid of a logic of controller 52) may initially take place in a query 1000. If fuel cell system 100 is in a stationary or upward-transient operating state 1001, the regulation of a cathode gas flow GS_K takes place in a step 1003 by varying position S of exhaust gas throttle means 36 as a manipulated variable. Parallel thereto, i.e., at the same time, the regulation of cathode pressure p_K takes place in a step 1004 by varying a rotational speed n of conveying means 32 as a manipulated variable. Rotational speed n of conveying means 32 is increased in a step 1010.

The indicated sequences are illustrated in FIG. 3. Waste throttle means 40 and bypass throttle means 44 may remain closed.

If it is revealed in query 1000 that fuel cell 10 is in a downward-transient operating state 1002, the regulation of cathode gas flow GS_K follows in a step 1005 by varying rotational speed n of conveying means 32 as a manipulated variable. Rotational speed n of conveying means 32 is decreased in a step 1011 (see FIG. 5). At the same time, the regulation of cathode pressure p_K takes place in a step 1006 by varying position S of exhaust gas throttle means 36 as a manipulated variable. Also simultaneously, the regulation of cathode gas flow GS_K may take place in a step 1007 by varying a position of waste throttle means 40 as a manipulated variable, and/or the regulation of cathode gas flow GS_K may take place in a step 1008 by varying a position of bypass throttle means 44 as a manipulated variable.

After steps 1003 through 1008 have been carried out, query 1001 is repeated. To be able to respond to short-term changes in a setpoint setting of the pressure and the temperature, query 1001 may already have been carried out when the setpoint settings in preceding query 1001 have not yet been reached, i.e., even prior to end point in time t_e.

A step 1009 of reducing the flow resistance initially takes place, followed by a step 1012 of increasing the flow resistance, in stationary, downward-transient as well as upward-transient mode.

LIST OF REFERENCE NUMERALS

100 fuel cell system
10 fuel cell/fuel cell stack
11 individual cell
12 anode space
13 cathode space
14 membrane electrode assembly (MEA)
15 bipolar plate (separator plate, flow field plate)
20 anode supply path
21 anode input
22 anode exhaust gas path
23 anode output
24 cathode supply path
25 cathode input
26 cathode gas path
27 cathode output
28 moisture exchanger
29 humidifier bypass valve
30 air filter
32 conveying means/compressor/turbocompressor
34 electric motor
36 exhaust gas throttle means/exhaust gas throttle valve
38 waste path
40 waste throttle means/waste throttle valve/waste gate
42 bypass path
44 bypass throttle means/bypass throttle valve
46 regulating device
48 air mass meter
50 pressure sensor
52 controller
54 line of constant rotational speed of a screw-type compressor
GS_K cathode gas flow
$p_{13}$ K cathode pressure
$GS_{13}$ W waste gas flow
GS_B bypass gas flow
p_e compressor input pressure
p_a compressor output pressure
p_e/p_a pressure ratio
D flow rate
B operating characteristic line of the fuel cell
n rotational speed
PG pump limit
L_h high load
L_n low load
S position of the exhaust gas throttle element
t time
t_s start point in time
t_e end point in time
n_s start rotational speed
n_e end rotational speed
S_s start position
S_e end position
999 method
1000 query of an operating state
1001 stationary or upward-transient operating state
1002 downward-transient operating state
1003 step of regulating the cathode gas flow with the aid of the exhaust gas throttle means
1004 step of regulating the cathode pressure with the aid of the conveying means
1005 step of regulating the cathode gas flow with the aid of the conveying means
1006 step of regulating the cathode pressure with the aid of the exhaust gas throttle means
1007 step of regulating the cathode gas flow with the aid of the waste throttle means
1008 step of regulating the cathode gas flow with the aid of the bypass throttle means
1009 step of at least temporarily reducing the flow resistance
1010 step of increasing the rotational speed of the conveying means
1011 step of reducing the rotational speed of the conveying means
1012 step of increasing the flow resistance

What is claimed:

1. A method for operating a fuel cell system including: a fuel cell having a cathode input and a cathode output; a cathode supply path situated upstream from the cathode input and connected thereto; a cathode exhaust gas path situated downstream from the cathode output and connected thereto; a conveyor situated in the cathode supply path for conveying a cathode gas flow into the cathode input or an adjustable exhaust gas throttle situated in the cathode exhaust gas path for influencing a flow resistance of the cathode exhaust gas path; and a regulator configured to regulate the cathode gas flow or a cathode pressure, the method comprising the following steps at least in a stationary or upward-transient operation of the fuel cell:

regulating the cathode gas flow by varying a position of the exhaust gas throttle; and
  regulating a cathode pressure by varying a rotational speed of the conveyor;
  wherein an increase in the cathode gas flow takes place during the upward-transient operation of the fuel cell, the method further comprising a step of at least temporarily reducing a flow resistance of the cathode exhaust gas path for increasing the cathode gas flow by varying the position of the exhaust gas throttle; and
  wherein during the upward-transient operation of the fuel cell, an increase in the cathode pressure takes place, and the method further comprising a step of increasing the rotational speed of the conveyor for increasing the cathode pressure, the temporarily reducing the flow resistance of the cathode exhaust gas path occurring before or at a same time as the increasing of the rotational speed.

2. The method as recited in claim 1 wherein the temporarily reducing the flow resistance of the cathode exhaust gas path takes place before the increasing the rotational speed of the conveyor for increasing the cathode pressure.

3. The method as recited in claim 1 wherein an increase in the cathode gas flow takes place during the upward-transient operation of the fuel cell, the step of at least temporarily reducing the flow resistance of the cathode exhaust gas path taking place at the beginning of a time period of the step of increasing the rotational speed of the conveyor.

4. The method as recited in claim 1 wherein further comprising the following steps during a downward-transient operation:
regulating the cathode gas flow by varying the rotational speed of the conveyor; or
regulating the cathode pressure by varying the position of the exhaust gas throttle.

5. The method as recited in claim 4 wherein during the downward-transient operation of the fuel cell:
a reduction of the cathode gas flow takes place, and the method further includes a step of reducing the rotational speed of the conveyor for reducing the cathode gas flow; or
a reduction of the cathode pressure takes place, and the method further includes a step of at least temporarily reducing the flow resistance of the cathode exhaust gas path by varying the position of the exhaust gas throttle.

6. The method as recited in claim 5 wherein the step of at least temporarily reducing the flow resistance of the cathode exhaust path occurs at the beginning of a time period of the step of reducing the rotational speed of the conveyor.

7. The method as recited in claim 1 wherein the fuel cell system:
has a waste path connecting the cathode supply path downstream from the conveyor to the cathode exhaust gas path downstream from the exhaust gas throttle and includes an adjustable waste throttle for influencing a flow resistance of the waste path, and the method further comprises a step of regulating the cathode gas flow by varying a position of the waste throttle; or
has a bypass path connecting the cathode supply path downstream from the conveyor to the cathode supply path upstream from the conveyor and includes an adjustable bypass throttle for influencing a flow resistance of the bypass path, and the method further comprises a step of regulating the cathode gas flow by varying a position of the bypass throttle.

8. The method as recited in claim 1 further comprising sensing a cathode supply path pressure downstream from the conveyor and upstream from or at the cathode input.

9. The method as recited in claim 8 further comprising regulating the cathode gas flow as a function of the sensing of the cathode supply path pressure.

10. A method for operating a fuel cell system including: a fuel cell having a cathode input and a cathode output; a cathode supply path situated upstream from the cathode input and connected thereto; a cathode exhaust gas path situated downstream from the cathode output and connected thereto; a conveyor situated in the cathode supply path for conveying a cathode gas flow into the cathode input or an adjustable exhaust gas throttle situated in the cathode exhaust gas path for influencing a flow resistance of the cathode exhaust gas path; and a regulator configured to regulate the cathode gas flow or a cathode pressure, the method comprising the following steps:
during an upward-transient operation of the fuel cell, temporarily reducing a flow resistance of the cathode exhaust gas path by varying the position of the exhaust gas throttle; and
during a downward-transient operation of the fuel cell, also temporarily reducing the flow resistance of the cathode exhaust gas path by varying the position of the exhaust gas throttle.

11. The method as recited in claim 10 wherein during the upward-transient operation of the fuel cell, an increase in the cathode pressure takes place, and the method further comprising a step of increasing the rotational speed of the conveyor for increasing the cathode pressure,
the temporarily reducing the flow resistance of the cathode exhaust gas path during the upward-transient operation occurring before or at a same time as the increasing of the rotational speed.

12. The method as recited in claim 11 wherein during the downward-transient operation of the fuel cell, the method further includes a step of reducing the rotational speed of the conveyor for reducing the cathode gas flow.

13. A method for operating a fuel cell system including: a fuel cell having a cathode input and a cathode output; a cathode supply path situated upstream from the cathode input and connected thereto; a cathode exhaust gas path situated downstream from the cathode output and connected thereto; a conveyor situated in the cathode supply path for conveying a cathode gas flow into the cathode input or an adjustable exhaust gas throttle situated in the cathode exhaust gas path for influencing a flow resistance of the cathode exhaust gas path; and a regulator configured to regulate the cathode gas flow or a cathode pressure, the method comprising the following steps at least in a stationary or upward-transient operation of the fuel cell:
regulating the cathode gas flow by varying a position of the exhaust gas throttle; or
regulating a cathode pressure by varying a rotational speed of the conveyor; and
further comprising sensing a cathode supply path pressure downstream from the conveyor and upstream from or at the cathode input, and regulating the cathode gas flow or the cathode pressure as a function of the sensing of the cathode supply path pressure.

14. The method as recited in claim 13 further comprising metering an air mass upstream of the conveyor.

15. The method as recited in claim 13 wherein both the cathode gas flow and the cathode pressure are regulated.

16. The method as recited in claim 13 wherein both the cathode gas flow and the cathode pressure are regulated during the upward-transient operation of the fuel cell.

17. The method as recited in claim 13 wherein during the upward-transient operation of the fuel cell, an increase in the cathode pressure takes place, and the method further comprising a step of increasing the rotational speed of the conveyor for increasing the cathode pressure,
a temporarily reducing the flow resistance of the cathode exhaust gas path occurring before or at a same time as the increasing of the rotational speed.

* * * * *